United States Patent [19]

Heinecke

[11] 3,803,759

[45] Apr. 16, 1974

[54] PLANT GROWTH PROMOTING AND PROTECTING DEVICE

[76] Inventor: Allen F. Heinecke, 323 Ten Allegheny Ctr., Pittsburgh, Pa. 15212

[22] Filed: Sept. 11, 1972

[21] Appl. No.: 287,768

[52] U.S. Cl.............................. 47/27, 47/47, 47/32
[51] Int. Cl............................................ A01g 13/02
[58] Field of Search........................... 47/26–30, 32, 47/47

[56] References Cited
UNITED STATES PATENTS

| | | | |
|---|---|---|---|
| 1,112,052 | 9/1914 | Campbell | 47/28 |
| 223,892 | 1/1880 | Delany | 47/32 |
| 2,822,644 | 2/1958 | Berger | 47/32 |
| 1,161,380 | 11/1915 | Denker | 47/28 |
| 2,763,096 | 9/1958 | Roger | 47/47 X |
| 921,484 | 5/1909 | Turner | 47/32 |
| 598,821 | 2/1898 | Simons | 47/28 |

Primary Examiner—Robert E. Pulfrey
Assistant Examiner—E. M. Coven
Attorney, Agent, or Firm—Parmelee, Miller, Welsh & Kratz

[57] ABSTRACT

A growth-promoting, protecting and supporting device has been devised for plants and particularly, for a seasonal type of plant which is to be retained in an upright position, which requires protection for starting it, or for a maximum rate of growth or yield. The device employs a pan having a plant stem by-passing central window portion, a set of rod-like pan-spacing and supporting and area-defining legs, and a substantially cone-shaped enclosure that may be used as needed. The legs extend endwise through outer peripheral portions of the pan and have a position-supporting locking engagement with the pan when in an assembled, upwardly converging and downwardly diverging relation therewith. The pan is shaped to strengthen it, to position the enclosure and to collect and flow moisture through its central window portion about the stem of a plant. The legs serve as a growth area defining means for the plant and are also provided along their vertical extent with the tie means for branches of the plant. A removable apex connector secures the legs in their assembled relation.

12 Claims, 16 Drawing Figures

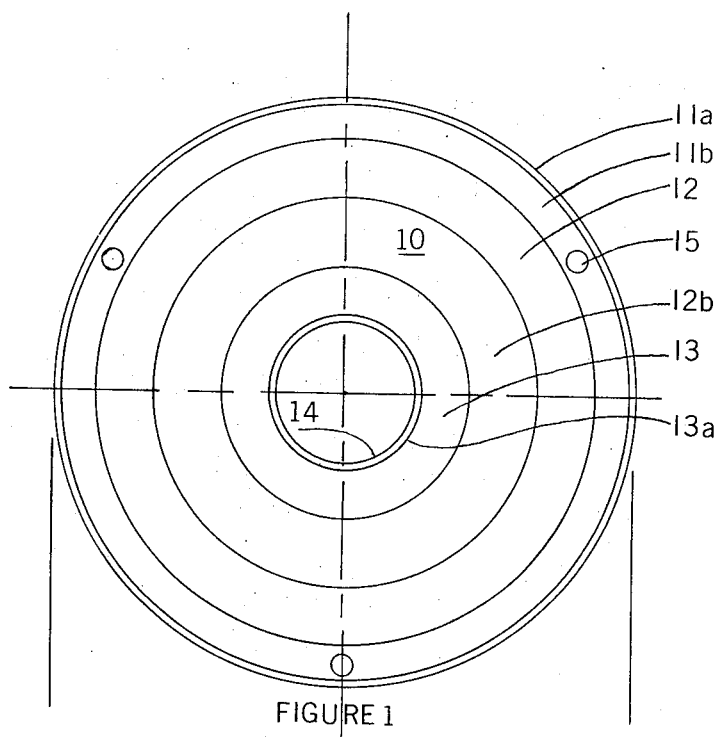
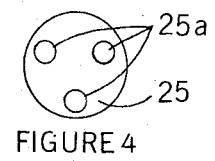
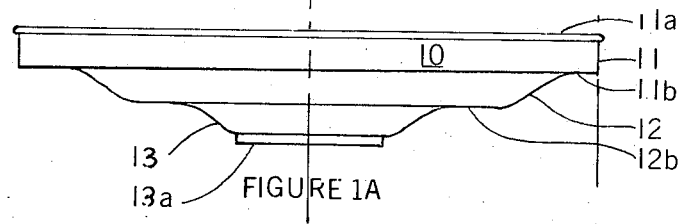
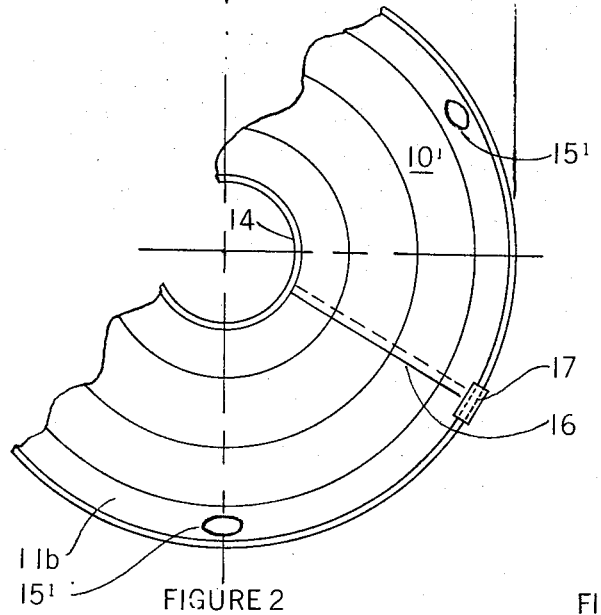
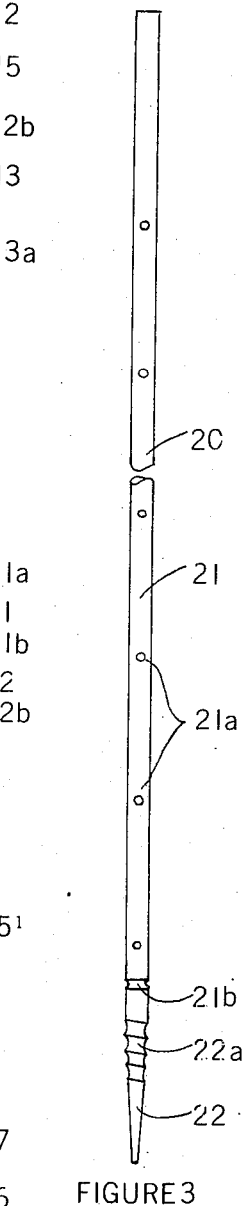
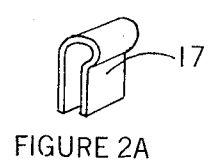

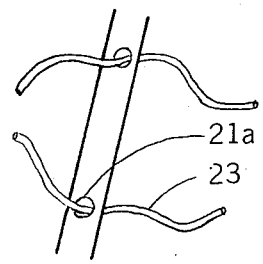
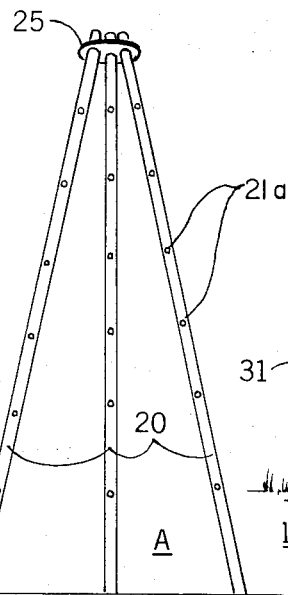
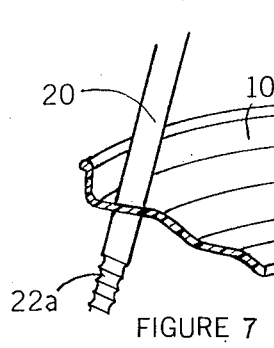
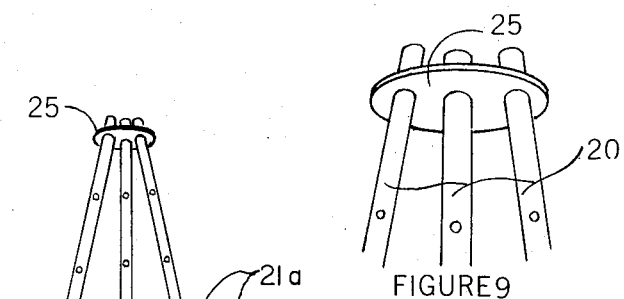
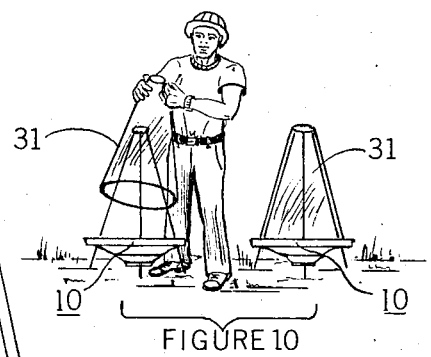
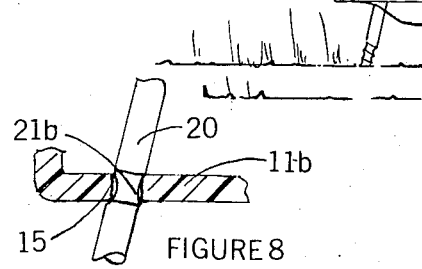
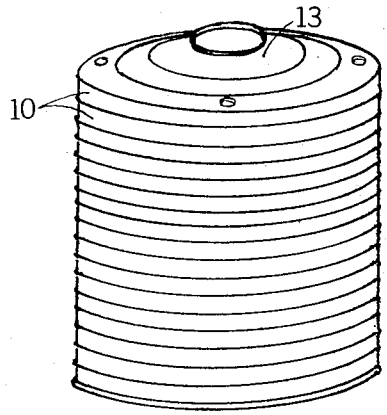
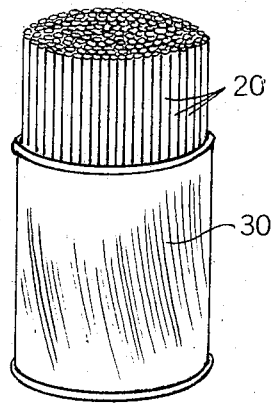
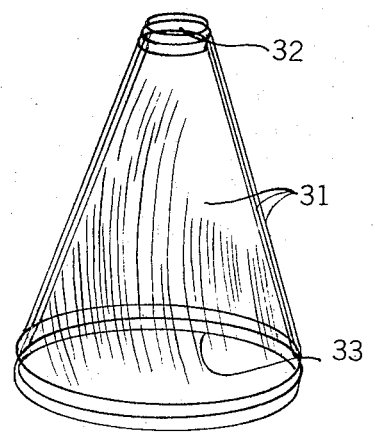
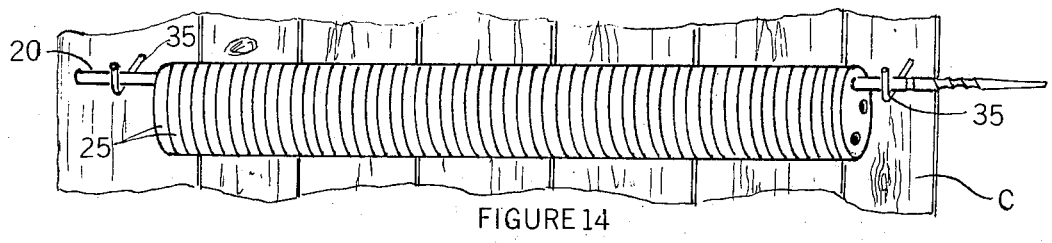

3,803,759

PLANT GROWTH PROMOTING AND PROTECTING DEVICE

BACKGROUND OF THE INVENTION

1. Field of the Invention

This invention relates to a plant growth promoting, protecting, mulching and yield improving device and particularly, to an assembly for protecting and supporting a plant, such as a fruit yielding plant, for the purpose of protecting it during initial starting stages after transplanting, for promoting growth and discouraging weeds and pests such as field mice, snails, etc., for improved moisturizing of the plant, for restricting its growth within area limits, and for providing a maximum yield of fruit and protection of the fruit as produced.

2. Description of the Prior Art

Heretofore, gardeners have tried various means and methods in an attempt to maximize plant growth, minimize insect and pest damage, and maximize protection of acceptable fruit. For example, straw, peat moss, wood chips and other mulching materials have been spread on the ground about the plant area. Rows of paperlike material such as black plastic or resin sheets have also been spread on the ground. However, former methods have been disadvantageous from the standpoint that some mulching materials tend to pick up nutrients that are needed for the plant and others tend to produce a mat that harbors snails and field mice. Plastic sheets involve considerable trouble and expense without promoting proper watering of the plants.

Other methods have been employed, including ground-positioned collars placed about the plant stem or stalk. However, difficulties have been encountered in placing the collar without damaging the plant foilage or its stem while, at the same time, enabling a proper distribution of moisture with respect to the plant. It has been determined that it is impractical to provide a means which rests substantially flat or in an abutting relation on the ground as it tends to harbor insects and to not permit proper breathing of the plant root area for best growth. Wire frames tend to tangle, are difficult to store, and are time-consuming in their installation. Poles are expensive and require extensive trimming and tieing of the plants.

In setting-out flowers, such as zinnias, and fruit bearing plants, such as pepper and tomatoe plants, care must be taken to provide ample protection from the elements and particularly the sun, in effecting a starting of the plants in their new outdoor location. In this connection, paper caps, buckets, boxes, etc. have been used. In some cases, it is advantageous to provide a cover which will permit the entrance of the sun's rays for hastening ripening of the fruit.

It has been determined that a device for the above purposes should be adaptable and capable of alternately using transparent and non-transparent enclosures. The device should be easy to assemble and disassemble, be relatively inexpensive to the grower from the standpoint of its initial cost and period of useful life, should be sturdy, adaptable and fully effective in its utilization, and be capable of convenient and compact storage when not in use.

SUMMARY OF THE INVENTION

It has thus been an object of the invention to solve the problem in this particular art and devise a growth promoting and protecting device for plants of improved construction and utilization.

Another object has been to devise a practical and efficient plant growth protecting and promoting device which will employ a minimum of parts, be easy to assemble and disassemble, and whose parts can be stored compactly for facilitating quick installation and storage.

Another object of the invention has been to devise a device which is flexible in its utilization.

A further object of the invention has been to provide a device whose parts may be used to define a growth area of a plant, and one that will facilitate support of the plant and retention of it in an upright fruit-bearing position.

A still further object has been to provide a device which will promote the maximum production of fruit in a fruit bearing plant, that will provide protection for the fruit, and that will enable the fruit to be maximized as to size and quality.

BRIEF DESCRIPTION OF THE DRAWINGS

In the drawings, FIG. 1 is a top plan view of a pan part of a device of the invention.

FIG. 1A is a side view in elevation on the scale of and of the pan of FIG. 1.

FIG. 2 is a fragmental top plan view on the scale of FIG. 1 illustrating a modified form of pan which is slit to facilitate its insertion or removal with respect to the trunk or stem of a growing plant.

FIG. 2A is an enlarged perspective detail view in elevation of a spring clip which may be used with the modified construction of FIG. 2A to removably retain slit edge portions of the pan in the closed position shown.

FIG. 3 is a vertical view in elevation illustrating the construction of legs of the device of the invention and is on the same scale as FIGS. 1 and 2.

FIG. 4 is a top plan view of a top tie or connector for legs of the device and is on the same scale as FIG. 3.

FIG. 5 is a reduced vertical view in elevation showing the device of the invention in a typical assembled ground-positioned relation, such as employed in its utilization.

FIG. 6 is an enlarged fragmental view in elevation taken through a leg part of the device and illustrating how plant ties may be utilized therewith.

FIG. 7 is also a vertical fragmental enlarged view in partial section illustrating the construction of the wall of the pan.

FIG. 8 is an enlarged vertical fragmental section illustrating how each leg is latched with respect to the pan part when the legs are in the upwardly converging and downwardly diverging assembled relation of FIG. 5.

FIG. 9 is an enlarged vertical fragment of the upper end of the construction shown in FIG. 5, further illustrating the mounting and utilization of the connector.

FIG. 10 is a somewhat diagrammatic, greatly reduced view in elevation illustrating how an outer enclosure of the construction may be positioned with respect to leg and pan parts of the assembly.

FIGS. 11, 12, 13 and 14 are views in elevation, respectively, illustrating how pan, leg, cone-shaped enclosure and connector parts may be compactly stored for easy utilization.

DESCRIPTION OF THE PREFERRED EMBODIMENTS

FIG. 5 shows an assembled device or unit of the invention which employs a main tray, pan or cup part 10, a group of upwardly converging and downwardly diverging legs 20, and a disc-like upper tie, apex or end connector 25. The legs 20 may be slightly driven or screwed into the soil or ground A from which the unit extends. FIG. 10 further illustrates the removably mounted positioning of a cone-shaped enclosing part 31. When the parts of the device are in the upstanding assembled positioning of FIG. 5, FIG. 8 illustrates how an offset, recessed or groove portion 21b of a leg 20 is latch-engaged within an associated hole portion 15 of the pan 10 to support the pan in an upwardly spaced relation with respect to the ground A.

FIGS. 1, 1A and 7 show details of the construction of the pan 10 which generally is of an overall rounded or annular shape and has a central window portion 14 through which the stem, stock or trunk of a plant, a bush or tree is adapted to extend. The window portion 14 is defined by an inner rim edge 13a. A series of relatively planar, downwardly inwardly offset, annular or circular, substantially horizontal wall portions 11b and 12b are connected with substantially vertical or inwardly downwardly sloped portions 12 and 13 to define an upwardly concave and materially strengthened pan 10. The concave pan 10 thus serves to collect moisture, flow it towards its center, and out through its window portion 14 about the stock of a plant which is being protected or supported. Outermost peripheral annular vertical wall portion 11 constitutes a rim flange which is surmounted by an out-turned or rounded rim edge 11a, on the pan 10 and between the rim flange and the legs 20. As shown in FIGS. 1 and 1A, the wall portion 13 terminates in an inner flange or rim 13a that defines the window portion 14.

The legs 20 are particularly illustrated in FIGS. 3, 6, 7 and 9 and are preferably of rounded, elongated shape. Each leg has a substantially uniform diameter along its body 21 and, at its lower end, has a taper 22 and a wide or course threading 22a to facilitate positioning it within the soil or ground A. Each leg 20 also has a recess or groove 21b which is of reduced diameter and which, as shown in FIG. 8, serves as a latching means with an associated hole portion 15 within the outer peripheral bottom wall 11 of the pan 10 and between its upwardly converging portions and its lower, ground-engaging pan-supporting foot portions.

In order to facilitate the tieing of branches of a plant, such as a tomatoe plant, within the area defined by the legs 20, vertically spaced-apart holes 21a are shown through which wire, string or other tie elements 23 may extend, see particularly FIG. 6. The legs 20 are removably held in their assembled and latched relation at their upper apex or converging ends by the connector 25 that is provided with through-extending holes to permit an endwise slide-on, automatic tightening action with respect to the upper end portions of the legs 20. The end connector 25 thus is the key to the retention of the device in its assembled relation, in that when it is removed by sliding it upwardly, this permits the legs 20 to be manually tilted to substantially straight vertical positions, such that they may be slidably removed endwise along their uniform diameter main body portions 21 through the holes 15 in the pan 10.

FIG. 1 shows three peripherally spaced-apart holes 15 such as to enable the use of three legs 20 in a triangular relation to define a cone-shaped plant growth area. The embodiment of FIG. 2 illustrates a modified form of pan 10' that has a cross-extending slit of cut edge portion 16 through the body thereof. In this construction, the pan 10' should be of a somewhat resilient material, so that it can be spread-apart manually to permit the sidewise insertion or removal of the pan 10' with respect to the stem, stock or trunk of an already-growing plant. If desired, a spring-like U-shaped clip 17 may be employed for frictional mounting on the rim flange assembly 11a, 11b for locking the cut edge portions 16 of the pan 10' together in a secure arrangement. Adjacent face or lip portions along the slit or cut 16 will preferably return to a slight overlapping relation when manual spreading force is released. It will be noted that the annular stepped construction of the pan gives it considerable strength and any necessary rigidity when used in an assembled relation.

FIG. 2A also illustrates a further modification in which holes 15' for receiving the legs 20 are somewhat elongated to provide a greater latching and supporting action with respect to the pan in its vertically upwardly offset spacing with respect to the ground A.

FIGS. 11, 12 and 13 illustrate how the three main parts of the device may be used in a space-saving, stored relation for facilitating the quick obtaining of parts when units are to be installed. The collector discs 25 may be stored in a smaller container corresponding to the cup-like container 30 of FIG. 12 that is used for the legs 20, or may have a wire threaded through and hung on a nail.

The enclosure 31 is also cone-shaped to correspond to the shape or area defined by the legs 20, and will have an open bottom or wide mouth portion and preferably an open upper end portion 32. Ordinarily, the enclosure 30 will be of a transparent or translucent resin or other inexpensive, lightweight material, but may be of an opaque nature where plants being set out are to be protected from the direct rays of the sun. After the plants have obtained a good start in the soil or ground, then the opaque enclosures may be removed and transparent enclosures substituted, in order to concentrate the rays of the sun on the plants. A transparent type is particularly suitable for the early spring and fall seasons of the year in that it will protect the plant from frost and maintain a relatively warm atmosphere about the plant.

FIG. 14 shows how a group of disc-like, top end connectors 25 may be assembled and carried on a leg part 20 that is removably positioned to extend horizontally along a wall C by a pair of spaced-apart screw eyelets or hooks 35.

The plant device of the invention reduces labor required to water, weed and harvest, keeps fruit free from stain and soil splash, prevents fruit from being hidden in mulch or weeds, accelerates growth and early ripening of fruit, and its apex or top end connector 25 may be used for application of suitable plant indentification.

I claim:

1. In a fully demountable plant growth promoting and protecting device having separable parts and being of the character shown and described for ground mounting when in an assembled relation, a bottom pan having a central window portion for receiving the stem of a plant to extend upwardly therethrough, a set of through-extending hole portions at peripherally spaced locations about the outer periphery of said pan, rod-like support legs one for each of said hole portions, each of said legs extending through an associated one of said hole portions and in an upwardly converging and downwardly diverging relation with respect to each other when assembled with said pan to define a conical space above said pan for growth of a plant and to define ground-engaging foot portions below said pan for supporting it, each of said legs having latching means positioned in a spaced relation above a lower end of its foot portion to latch-engage within an associated one of said hole portions and support said pan in an upwardly spaced relation with respect to the ground when said legs are positioned to extend therethrough in the above-defined assembled relation with respect to each other, and said latching means releasing said legs from latch-engagement within their associated hole portions when said legs are moved to substantially straight vertical positions within said hole portions whereby said legs may be removed from said pan through said hole portions.

2. In a device as defined in claim 1, means cooperating with upper end portions of said legs for removably securing them in a connecting apex relation with respect to each other when said legs are in the above-defined assembled relation with respect to said pan.

3. In a device as defined in claim 2, said means for securing said legs in the connecting apex relation being a perforated disc adapted to removably slide-fit over upper end portions of said legs.

4. In a device as defined in claim 1, said pan having a group of alternative vertical and horizontal annular wall portions that define a reinforced body, and said body being of upwardly concave shape and declining on its upper side radially inwardly from its outer edge to said central window portion to collect moisture and flow it towards and out through said window portion.

5. In a device as defined in claim 4, an outermost wall portion of said group being an upright rim flange defining the outer periphery of said body, and said hole portions being located closely adjacent to said rim flange.

6. In a device as defined in claim 1, said latching means being an offset portion on each of said legs to latch-engage an edge of the associated hole portion when said legs are in their defined assembled relation with respect to said pan.

7. In a device as defined in claim 6, said offset portion being a recess portion in each of said legs, and said legs having substantially uniform diameter portions above and below said recess portion.

8. In a device as defined in claim 2, each of said legs having vertically spaced apart plant-tieing hole portions along their respective lengths.

9. In a device as defined in claim 2, said pan having an upright rim flange about its outer periphery, and a substantially cone-shaped self-supporting open-bottom plant enclosure to fit over said legs and rest on said pan between said flange and said legs when said legs are in their defined assembled relation with respect to said pan.

10. In a device as defined in claim 9, said pan having a series of concentric annular wall portions, each of which is on a progressively lower level from an outer periphery thereof towards said central window portion, an innermost annular wall portion terminating in an edge that defines said central window portion, and an outermost annular wall portion terminating in said upright rim flange.

11. In a device as claimed in claim 1, said pan having a radial slit through its wall that extends radially from said central window portion to an outer edge thereof, and said pan being of resilient material and having cooperating edge portions along the slit for being manually forced-apart sufficiently to enter the stem of a plant within said central window portion and for, when released, moving to a closing-off relation with respect to each other, and said edge portions being aligned for overlapping slidable movement with respect to each other.

12. In a device as defined in claim 11, a spring-like clip for securely locking said edge portions together along the slit when said edge portions are in their closing-off relation with each other.

* * * * *